US012545039B2

(12) United States Patent
Jariabka et al.

(10) Patent No.: US 12,545,039 B2
(45) Date of Patent: Feb. 10, 2026

(54) PRINTING DEVICES WITH DISENGAGE-ABLE OUTPUT ROLLER PINCH

(71) Applicant: Hewlett-Packard Development Company, L.P., Spring, TX (US)

(72) Inventors: Keith William Joseph Jariabka, Vancouver, WA (US); Juan David Ramos, Vancouver, WA (US); Peter J. Boucher, Vancouver, WA (US); Brian Hemmerlin, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 136 days.

(21) Appl. No.: 18/293,077

(22) PCT Filed: Jul. 31, 2021

(86) PCT No.: PCT/US2021/044092
§ 371 (c)(1),
(2) Date: Jan. 29, 2024

(87) PCT Pub. No.: WO2023/014339
PCT Pub. Date: Feb. 9, 2023

(65) Prior Publication Data

US 2024/0367447 A1 Nov. 7, 2024

(51) Int. Cl.

| | |
|---|---|
| ***B41J 13/03*** | (2006.01) |
| ***B41J 3/60*** | (2006.01) |
| ***B41J 13/10*** | (2006.01) |
| ***B65H 5/06*** | (2006.01) |
| ***B65H 5/26*** | (2006.01) |
| ***B65H 85/00*** | (2006.01) |
| *B41J 13/00* | (2006.01) |

(52) U.S. Cl.
CPC ................ *B41J 13/03* (2013.01); *B41J 3/60* (2013.01); *B41J 13/106* (2013.01); *B65H 5/062* (2013.01); *B65H 5/26* (2013.01); *B65H 85/00* (2013.01); *B41J 13/0018* (2013.01); *B65H 2301/33312* (2013.01); *B65H 2404/1521* (2013.01); *B65H 2801/06* (2013.01); *B65H 2801/12* (2013.01)

(58) Field of Classification Search
CPC ... B41J 13/03; B41J 3/60; B41J 13/106; B41J 13/0018; B65H 5/062; B65H 5/26; B65H 85/00; B65H 2301/33312; B65H 2404/1521; B65H 2801/06; B65H 2801/12
See application file for complete search history.

(56) References Cited

U.S. PATENT DOCUMENTS

| | | | |
|---|---|---|---|
| 6,293,716 B1 | 9/2001 | Driggers et al. | |
| 2003/0194253 A1 | 10/2003 | Trovinger | |

(Continued)

FOREIGN PATENT DOCUMENTS

| | | |
|---|---|---|
| EP | 0899115 A1 | 3/1999 |

*Primary Examiner* — Henok D Legesse
(74) *Attorney, Agent, or Firm* — Foley & Lardner LLP

(57) ABSTRACT

An example printing device includes a print zone in which printing agent is deposited onto a print media. In addition, the printing device includes a first path extending through the print zone to an output roller pinch, and a second path extending into the printing device from the output roller pinch. The output roller pinch is to disengage to allow simultaneous advancement of print media along the first path and the second path.

14 Claims, 11 Drawing Sheets

(56) References Cited

U.S. PATENT DOCUMENTS

| | | | | |
|---|---|---|---|---|
| 2007/0013120 | A1* | 1/2007 | Lo | B65H 29/58 271/3.14 |
| 2019/0358973 | A1* | 11/2019 | Komuro | B65H 5/062 |

* cited by examiner

PRINTING DEVICES WITH DISENGAGE-ABLE OUTPUT ROLLER PINCH

BACKGROUND

A printing device may be used to deposit printing agent (e.g., liquid printing agent, toner) on print media. The print media may comprise sheets of paper having two sides. During operations, a printing device may flip or rotate the print media so as to deposit printing agent on both sides thereof. This type of printing is referred to as "duplex printing."

BRIEF DESCRIPTION OF THE DRAWINGS

Various examples will be described below referring to the following figures.

DETAILED DESCRIPTION

A printing device may perform duplex printing. As a result, such a printing device may have multiple print media paths defined therein for maneuvering the print media through a print zone such that both sides of the print media may have printing agent deposited thereon. These multiple and often intersecting paths may have sufficient length to accommodate the print media without jamming, which thereby contributes to an overall increase in the size of such a printing device. Accordingly, a printing device for performing duplex printing may not be sufficiently compact for some situations and/or spaces.

Accordingly, examples herein include printing devices that are to perform duplex printing while also maintaining a relatively small size thereof. In some examples, a printing device may include an output roller pinch that is selectively disengage-able thereby allowing print media to progress in opposing directions along multiple, overlapping and/or intersecting print media paths simultaneously. As a result, an overall size of the printing device may be reduced without sacrificing duplex printing functionality.

Figure 1:
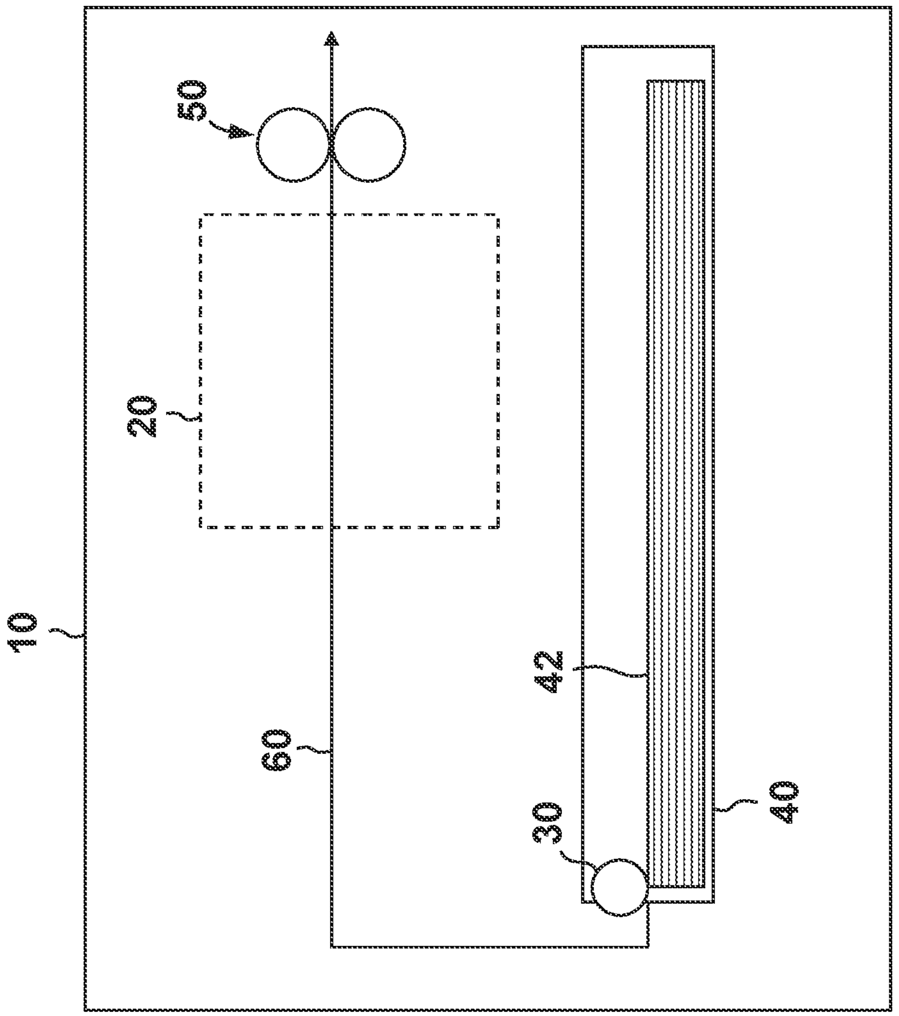
FIGS. 1-3 are schematic views of a printing device having a disengage-able output roller pinch according to some examples.
Figure 2:
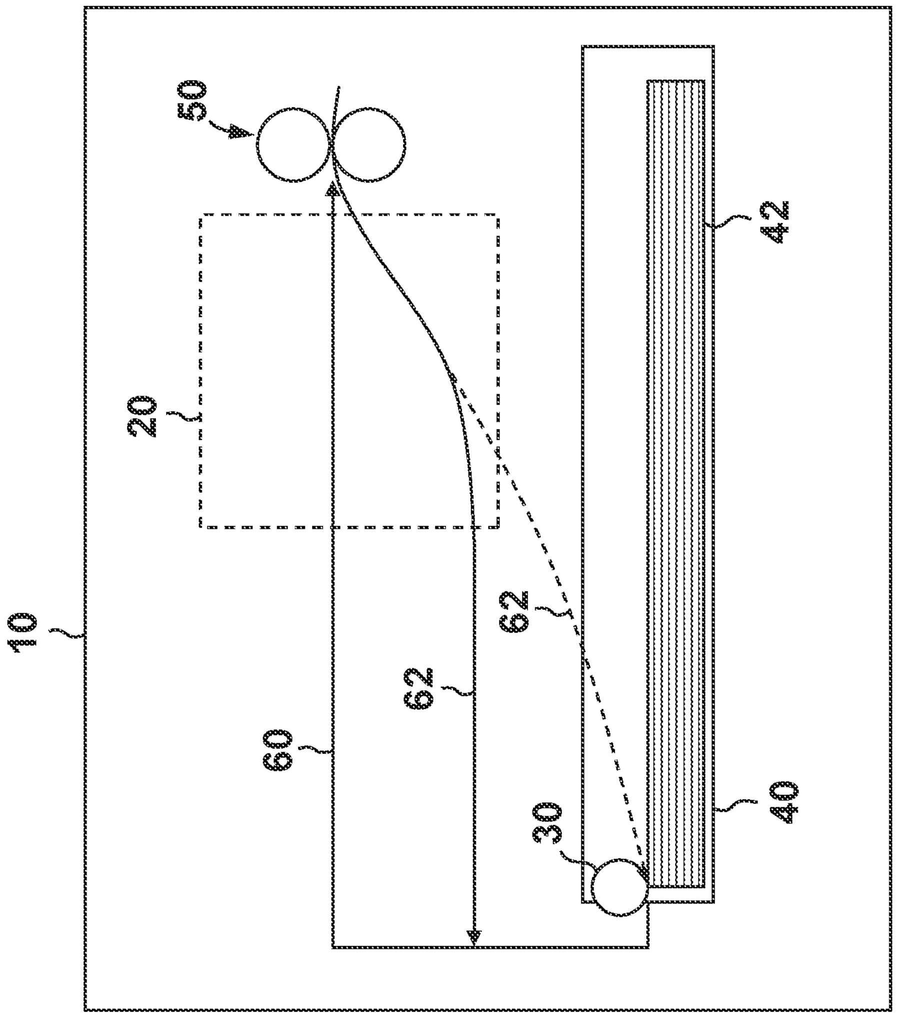
Figure 3:
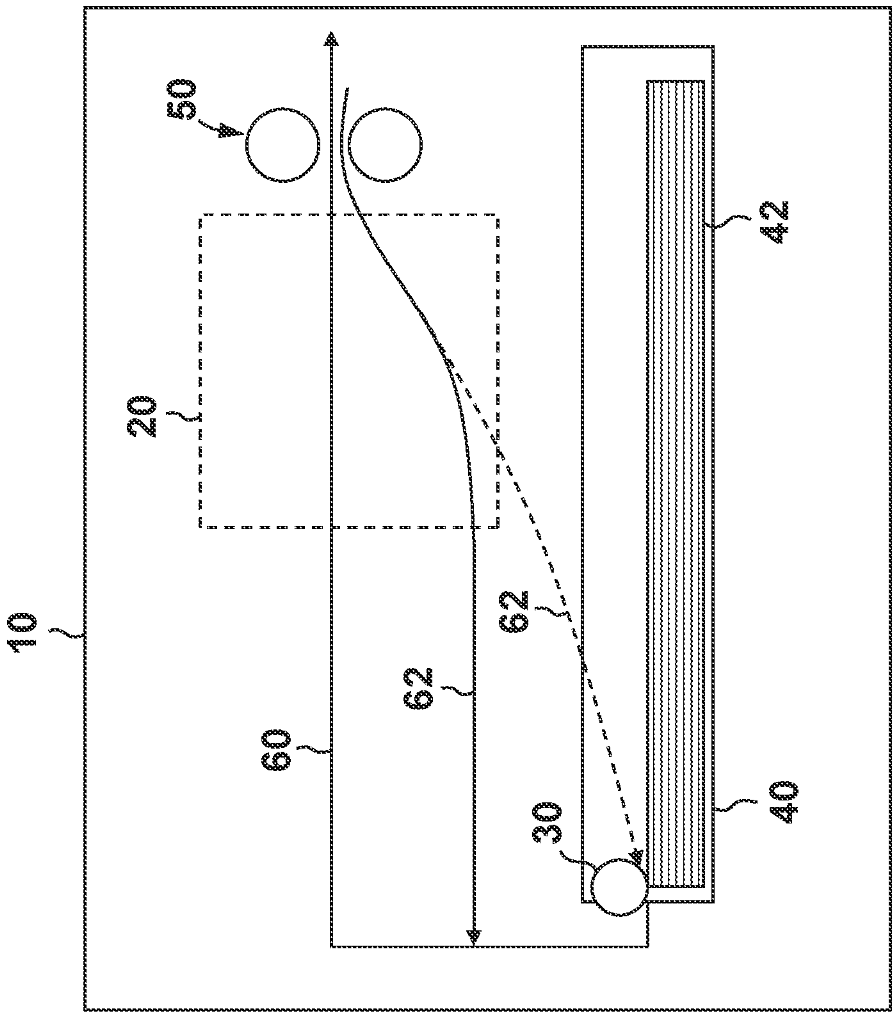

Referring now to FIGS. 1-3, a printing device 10 including a selectively disengage-able output roller pinch 50 according to some examples is shown. Printing device 10 includes a print zone 20 within which printing agent is deposited onto print media to form images (e.g., pictures, text, graphics) thereon. In some examples, print zone 20 may deposit liquid printing agent (e.g., ink) onto print media 42 during operations (e.g., such that printing device 10 may comprise a so-called inkjet printer). In some examples, print zone 20 may deposit non-liquid printing agent (e.g., toner) onto print media 42 during operations (e.g., such that printing device 10 may comprise a so-called laser jet printer). The print media 42 may comprise any suitable substrate that may receive printing agent for purposes of forming images thereon. In some examples, the print media 42 may comprise paper, such as, for instance, sheets of paper.

Printing device 10 may include a print media tray 40 that holds a volume (e.g., a number of sheets) of print media 42 therein. As shown in FIG. 1, during operations, print media 42 may be extracted from print media tray 40 by a pick roller 30, which then directs the print media 42 along a first print media path 60 (or more simply "first path 60") to and through print zone 20, toward output roller pinch 50 such that printing agent may be deposited on a first side of the print media 42. As shown in FIG. 2, the printing device 10 may also include a second print media path 62 (or more simply "second path 62") that is to direct print media 42 from output roller pinch 50 back toward the first path 60 and print zone 20 such that printing agent may be deposited on a second side of the print media 42. Accordingly, by routing the print media 42 along the first path 60 and the second path 62, both sides of the print media may have printing agent deposited thereon via print zone 20, so that printing device 10 may perform duplex printing as previously described.

As shown in FIG. 2, in some examples, the second path 62 (e.g., in solid line in FIG. 2) may return the print media 42 to the first path 60 at a point that is downstream (e.g., with respect to the movement of print media 42 along first path 60) of the print media tray 40 and pick roller 30. However, in some examples, the second path 62 (e.g., in dotted line in FIG. 2) may return the print media 42 back to the print media tray 40 so as to be once again engaged with the pick roller 30 and advanced to the print zone 20 along first path 60 as previously described. In some examples, when the second path 62 routes the print media 42 back to the pick roller 30, the print media 42 may engage with (e.g., slide along) other pieces (e.g., sheets) of print media 42 that are stored within print media tray 40. Regardless of whether the second path 62 extends to the pick roller 30 (e.g., dotted line for second path 62) or downstream of the pick roller 30 (e.g., solid line for second path 62), when print media 42 returns to the print zone 20 via the second path 62, the print media 42 is flipped relative to its previous orientation (e.g., when the print media was initially moved through the print zone 20 along first path 60) so as to allowing printing agent to be deposited along the second side.

Based on the length of the paths 60, 62 as well as the length of the print media 42, in some examples a single sheet of print media may be advancing past the output roller pinch 50 along the first path 60 and the second path 62 simultaneously. That is, a leading edge (with respect to the direction of movement within printing device 10) of the print media 42 may be exiting printing device 10 via output roller pinch 50 while a trailing edge of the print media 42 may be entering the printing device 10 via output roller pinch 50. Alternatively, in some examples, a first piece of print media 42 may be advancing past the output roller pinch 50 along the first path 60, while a second sheet of print media 42 may be advancing past the output roller pinch 50 along second path 62. However, generally speaking, print media 42 may not be able to progress past the engaged output roller pinch 50 in two directions, simultaneously (e.g., rotation of output roller pinch 50 may allow print media 42 to advance thereby in a selected direction).

Accordingly, as shown in FIG. 3, printing device 10 (or a controller thereof as described in more detail below) may selectively disengage output roller pinch 50 (e.g., by separating the rollers of output roller pinch 50) to allow print media 42 to advance past output roller pinch 50 in two opposing directions simultaneously. Thus, a leading edge of a sheet of print media 42 may advance through print zone 20 and past output roller pinch 50 along first path 60 while a trailing portion of the sheet of print media 42 (or a different sheet of print media 42) may advance back into the printing device 10 toward print zone 20 via second path 62. As a result, a length of the paths 60, 62 may be reduced without affecting the progression of print media 42 within printing device 10, and the outer dimensions (e.g., size) of the printing device 10 may be reduced. Further details of examples of printing device 10 are now provided below to further illuminate these aspects.

Figure 4:
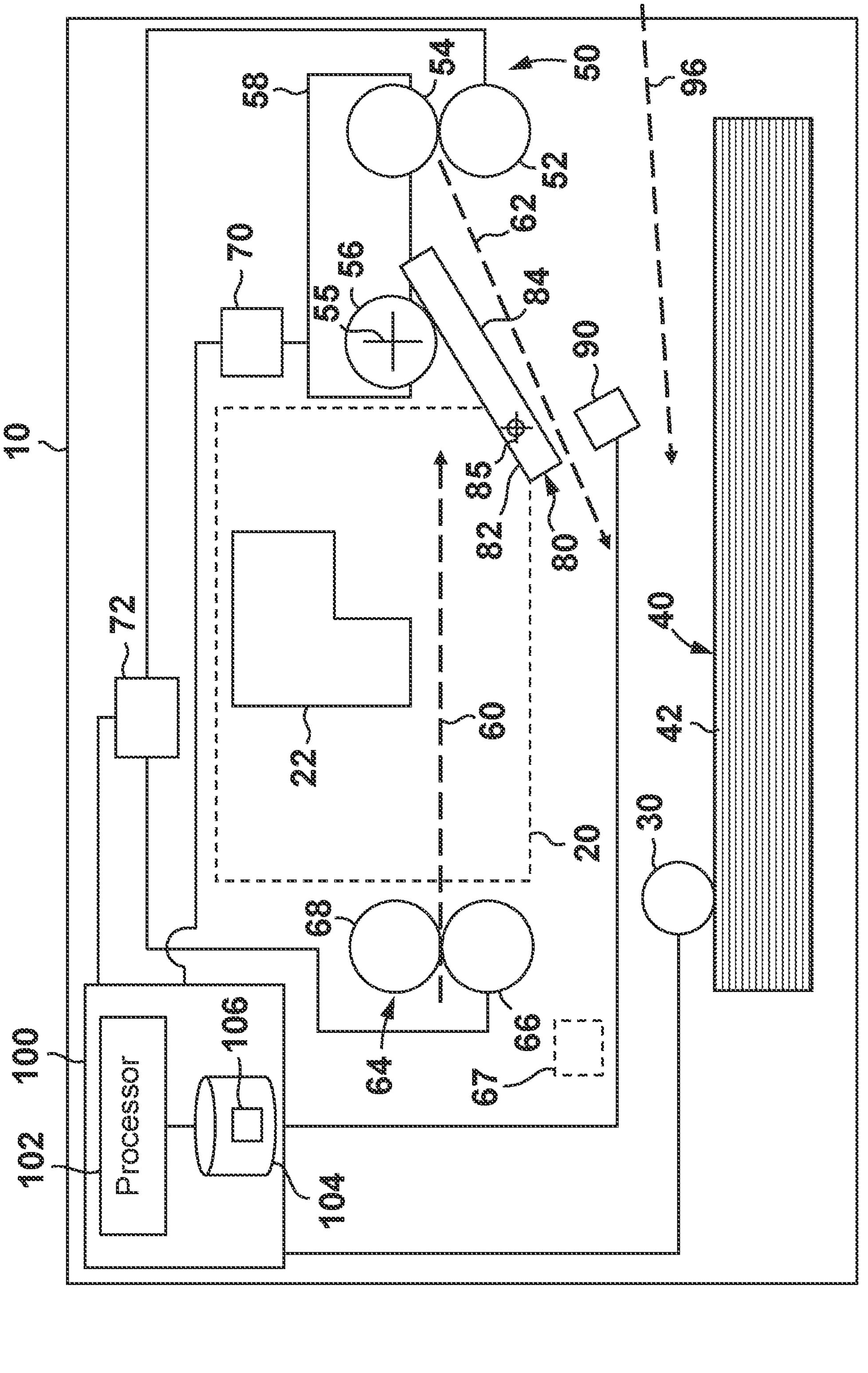
FIG. 4 is a schematic view of a printing device having a disengage-able output roller pinch according to some examples.

Referring now to FIG. 4, in some examples, printing device 10 may comprise a feed roller pinch 64 that is upstream of print zone 20 (e.g., with respect to the progression of print media 42 within printing device 10). Thus, the print zone 20 may be positioned between the feed roller pinch 64 and the output roller pinch 50, such that the input roller pinch 64 and the output roller pinch 50 may both be positioned adjacent to the printing member 22 within printing device 10. In some examples, print zone 20 may comprise a printing member 22 that is to deposit printing agent on print media (e.g., print media 42) during operations. In some examples, printing member 22 comprises a pen that is to emit liquid printing agent (e.g., ink). In some examples, printing member 22 may comprise a drum for transferring toner onto print media (e.g., print media 42).

Feed roller pinch 64 and output roller pinch 50 may each comprise a drive roller 66 and 52, respectively, that are both driven by a common motor 72 (e.g., electric motor). The drive roller 66 of feed roller pinch 64 may be referred to as a "feed roller 66" and the drive roller 52 of the output roller inch 50 may be referred to as an "output roller 52." Motor 72 may selectively rotate the feed roller 66 and output roller 52 in the same direction during operations, such that feed roller 66 and output roller 52 may be simultaneously rotated in a clockwise or counter-clockwise direction (from a fixed viewing direction). The feed roller 66 and the output roller 52 may also be engaged with idler wheels 68 and 54, respectively, to form the feed roller pinch 64 and output roller pinch 50, respectively. The idler wheels 68 and the idler wheel 54 are to rotate freely during operations via the feed roller 66 and output roller 52, respectively. Specifically, when feed roller 66 of feed roller pinch 64 is rotated by motor 72, the engagement of feed roller 66 with idler wheel 68 may also result in a corresponding (and opposite) rotation of the idler wheel 68. Likewise, when output roller 52 is rotated by motor 72, the engagement of output roller 52 with idler roller 54 may also result in a corresponding (and opposite) rotation of the idler wheel 54.

Idler wheel 54 may be coupled to a rocker assembly 58 that is also coupled to another idler wheel 56, so that idler wheels 54, 56 are spaced from one another via rocker assembly 58 (e.g., idler wheel 54 may rotate about an axis of rotation that is parallel to and radially offset from axis of rotation of idler wheel 56). Both idler wheels 56, 54 may rotate freely relative to rocker assembly 58 during operations. In addition, rocker assembly 58 may be pivoted about an axis of rotation 55 of idler wheel 56 so as to selectively engage and disengage the idler wheel 54 with and from, respectively, the output roller 52 within output roller pinch 50. In particular, an actuator 70 (e.g., electric motor) may be coupled to rocker assembly 58 and may drive rotation of rocker assembly 58 about axis of rotation 55 of idler wheel 56 during operations. Further details of examples of actuator 70 are described in more detail below.

In some examples, the rollers, wheels, etc. of the printing device 10 (e.g., rollers 30, 66, 52, and idler wheels 54, 68, 56) may each comprise a plurality of rollers or wheels positioned along common shafts. For instance, the feed roller pinch 64 may comprise a plurality of feed rollers 66 and idler wheels 68 positioned along a pair of parallel shafts. Similarly, the idler wheel 56 may comprise a plurality of idler wheels 56 positioned along a common shaft extending along axis of rotation 55 and that is coupled to rocker assembly 58. Further, the output roller pinch 50 may comprise a plurality of output rollers 52 and idler wheels 54 positioned along a pair of parallel shafts—with the shaft coupled to the plurality of idler wheels 54 being coupled to the rocker assembly 58 as previously described.

A pivotable gate 80 is coupled along first path 60, and positioned between the printing member 22 and output roller pinch 50 (e.g., with respect to the advancement of print media 42 along first path 60 from print zone 20 to output roller pinch 50). The gate 80 includes a first side 82 and a second side 84 opposite first side 82. The gate 80 may be pivoted about an axis of rotation 85 during operations so as to move the first side 82 toward and away from the idler wheel 56. The gate 80 may be biased into engagement with idler wheel 56. In particular, the gate 80 may be pivotably biased about axis of rotation 85 (e.g., via a biasing member such as a torsional spring or coiled spring, or via a counter weight) so that first side 82 is biased into engagement with idler wheel 56 during operations. The first path 60 may extend along first side 82 of gate, while second path 62 may extend along second side 84 of gate 80.

A sensor 90 is positioned along second path 62, downstream of output roller inch 50 (e.g., relative to the progression of print media 42 along second path 62). The sensor 90 may comprise any suitable sensor for detecting the presence (e.g., directly or indirectly) of print media 42 along the second path 62. For instance, in some examples, the sensor 90 may comprise an optical sensor, a proximity sensor, etc.

The motor 72, actuator 70, and sensor 90 may be coupled to a controller 100 of the printing device 10. Controller 100 may comprise a processor 102 and a memory 104. The processor 102 may comprise any suitable processing device, such as a microcontroller, central processing unit (CPU), graphics processing unit (GPU), timing controller (TCON), scaler unit. The processor 102 executes machine-readable instructions (e.g., machine-readable instructions 106) stored on memory 104, thereby causing the processor 102 to perform some or all of the actions attributed herein to the controller 100. In general, processor 102 fetches, decodes, and executes instructions (e.g., machine-readable instructions 106). In addition, processor 102 may also perform other actions, such as, making determinations, detecting conditions or values, etc., and communicating signals. If processor 102 assists another component in performing a function, then processor 102 may be said to cause the component to perform the function.

The memory 104 may comprise volatile storage (e.g., random access memory (RAM)), non-volatile storage (e.g., flash storage, etc.), or combinations of both volatile and non-volatile storage. Data read or written by the processor 102 when executing machine-readable instructions 106 can also be stored on memory 104. Memory 104 may comprise "non-transitory machine-readable medium," where the term "non-transitory" does not encompass transitory propagating signals.

The processor 102 may comprise one processing device or a plurality of processing devices that are distributed within printing device 10. Likewise, the memory 104 may comprise one memory device or a plurality of memory devices that are distributed within the printing device 10.

During operations, the controller 100 may selectively rotate the feed roller 66 and output roller 52 via motor 72 to advance print media (e.g., print media 42) along the first path 60 and/or the second path 62 as generally described above. In addition, during operations, the controller 100 may selectively disengage the output roller pinch 50 by rotating the rocker assembly 58 about axis of rotation 55 to allow print media 42 to simultaneously advance in opposing directions across the output roller pinch 50 as previously described. The rotation of feed roller pinch 64, output roller pinch 50, and rocker assembly 58 are now described in more detail below in the context of a printing operation (e.g., such as a duplex printing operation) with printing device 10.

Referring now to FIGS. 5A-5E, a printing operation for the printing device 10 is shown according to some examples. The printing operation of FIGS. 5A-5E may comprise duplex printing operation for a sheet of print media 42 (e.g., such as a sheet of paper). However, in some examples, the printing operation of FIGS. 5A-5E may be generally applied for printing (e.g., duplex printing) on multiple sheets or pieces of print media 42.

In addition, the depictions of printing device 10 in FIGS. 5A-5E are simplified, such that some components of printing device 10 are not shown. However, it should be noted that printing device 10 may include the other components previously described above in some examples (e.g., controller 100, print media tray 40, etc.).

Figure 5A:
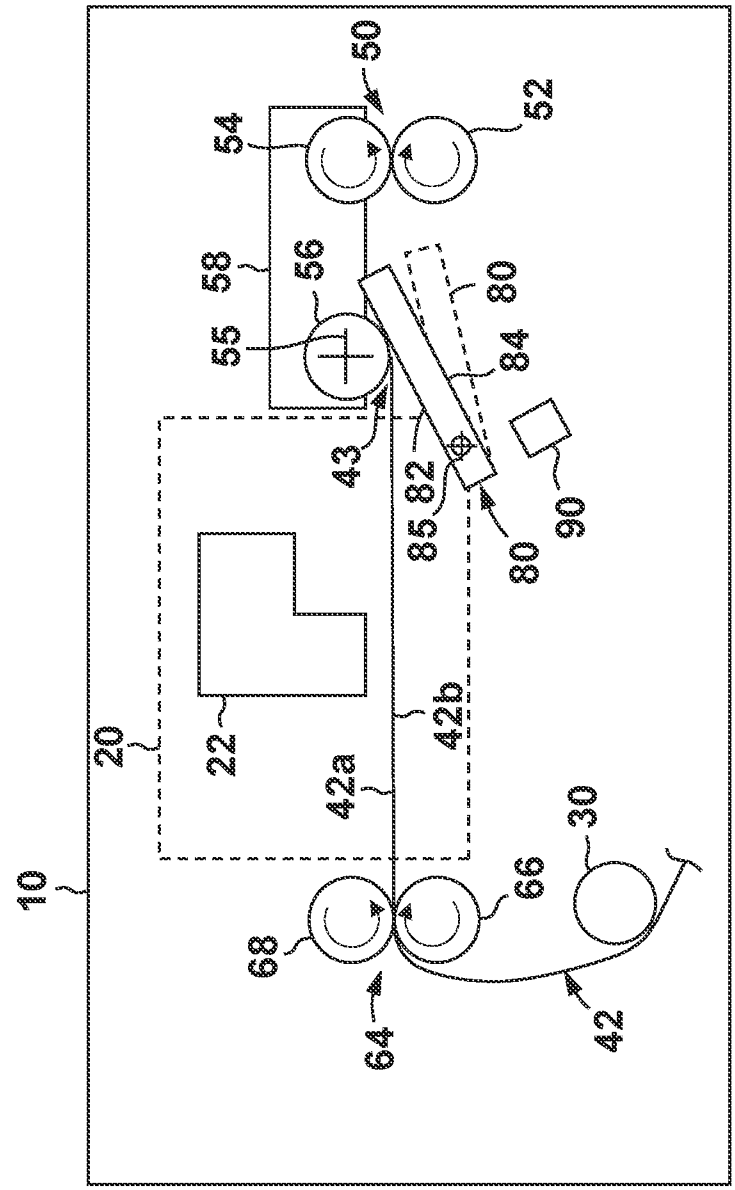
FIGS. 5A-5E are sequential schematic views of a printing device having a disengage-able output roller pinch according to some examples.

Referring first to FIG. 5A, a piece of print media 42 may be initially progressed along first path 60 via pick roller 30 to feed roller pinch 64. As previously described, the piece of print media 42 may be advanced along first path 60 to feed roller pinch 64 via the pick roller 30 (and other rollers or pinches in some examples) from a print media tray (e.g., print media tray 40 shown in FIGS. 1-3).

A first edge 43 of the print media 42 (which initially may comprise a leading edge for the print media 42) is engaged with the feed roller pinch 64. The feed roller 66 may be rotated (e.g., by motor 72 shown in FIG. 4 and previously described) so as to move the first edge 43 between driver roller 66 and idler wheel 68 and into print zone 20. As the print media 42 advances through print zone 20, a first side 42*a* of the print media 42 may face the printing member 22 (so that printing member 22 may deposit printing agent thereon), while a second side 42*b* of the print media 42 may face away from printing member 22.

Referring still to FIG. 5A, the first edge 43 of print media 42 may advance out of print zone 20 and may then engage with first side 82 of gate 80 and idler wheel 56 of rocker assembly 58. As previously described, the first side 82 of gate 80 may be rotationally biased about axis of rotation 85 so as to engage with the idler wheel 56. Accordingly, first edge 43 of print media 42 may engage with idler wheel 56 and first side 82 of gate 80 simultaneously (or substantially simultaneously), so that the first edge 43 of print media 42 is sufficiently stiffened by the idler wheel 56 to deflect gate 80 (e.g., about axis of rotation 85) and thereby allow first edge 43 of print media 42 to advance to output roller pinch 50. In addition, simultaneous engagement (or substantially simultaneous engagement) of the first edge 43 of print media 42 with the first side 82 of gate 80 and the idler wheel 56 may prevent deflection and deformation of the print media 42 within print zone 20 (which may degrade the quality of images formed on print media 42).

Figure 5B:
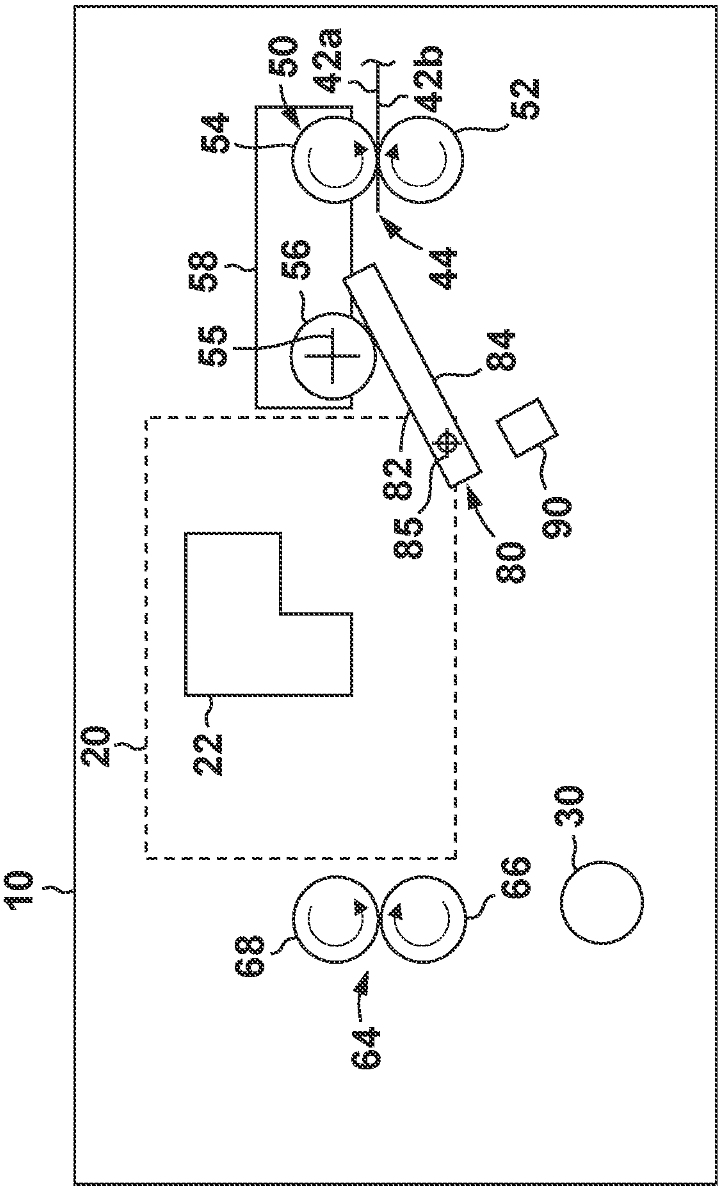
Figure 5C:
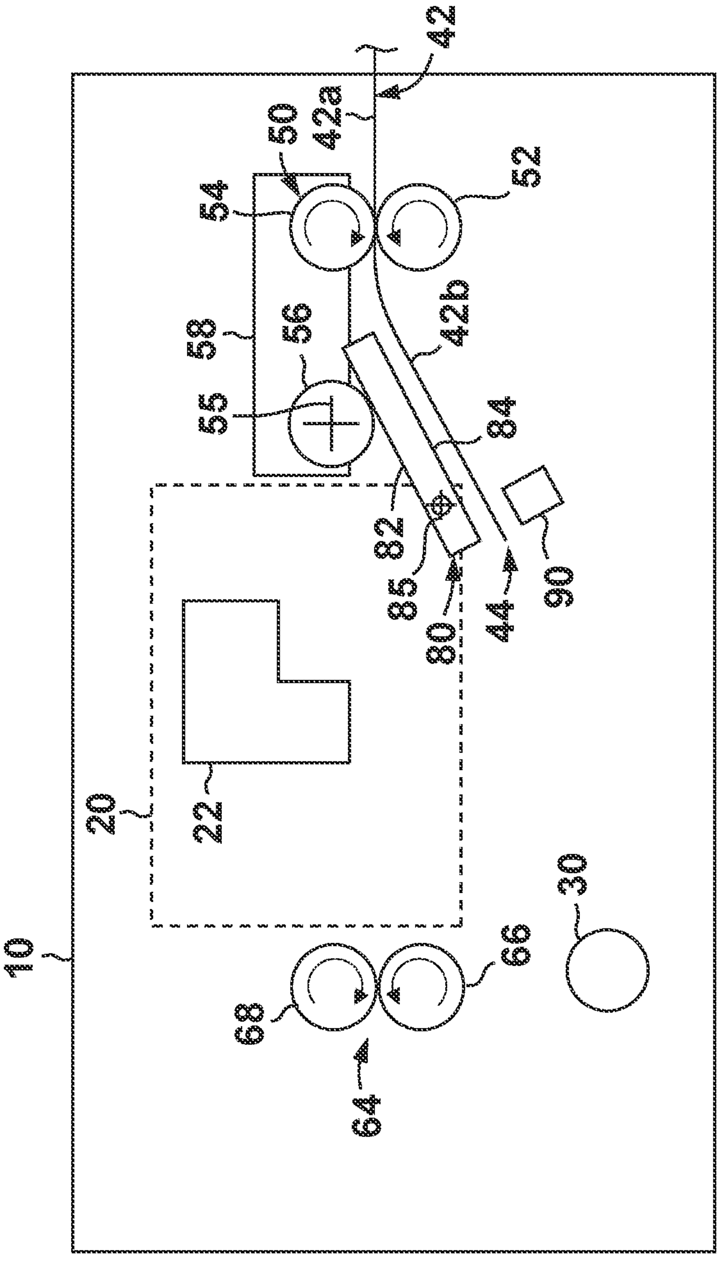

Referring now to FIG. 5B, the output roller 52 of output roller pinch 50 may be rotated along with the feed roller 66 of feed roller pinch 64 (e.g., by the motor 72) so that when the first edge 43 (FIG. 5A) engages with the output roller pinch 50, print media 42 may advance between the output roller 52 and idler wheel 54 and out of the printing device 10. The print media 42 may continue to advance past the output roller pinch 50 until a second edge 44 of the print media 42 (e.g., which is opposite the first edge 43 and which may initially comprise a trailing edge for print media 42) is advanced through the print zone 20 and past the gate 80 and idler wheel 56. Once the second edge 44 of print media 42 advances past gate 80 and idler wheel 56, gate 80 may rotate about axis of rotation 85 to re-engage with idler wheel 56 via the rotational bias previously described. Then, as shown in FIG. 5C, the rotation of the output roller 52 of output roller pinch 50 may be reversed (e.g., by the motor 72) such that the second edge 44 of the print media 42 is advanced back into printing device 10 toward second side 84 of gate 80. However, because gate 80 is in contact (e.g., along first side 82) with the idler wheel 56, the second side 84 of gate 80 may deflect the second edge 44 away from the first path 60 and into second path 62.

Figure 5D:
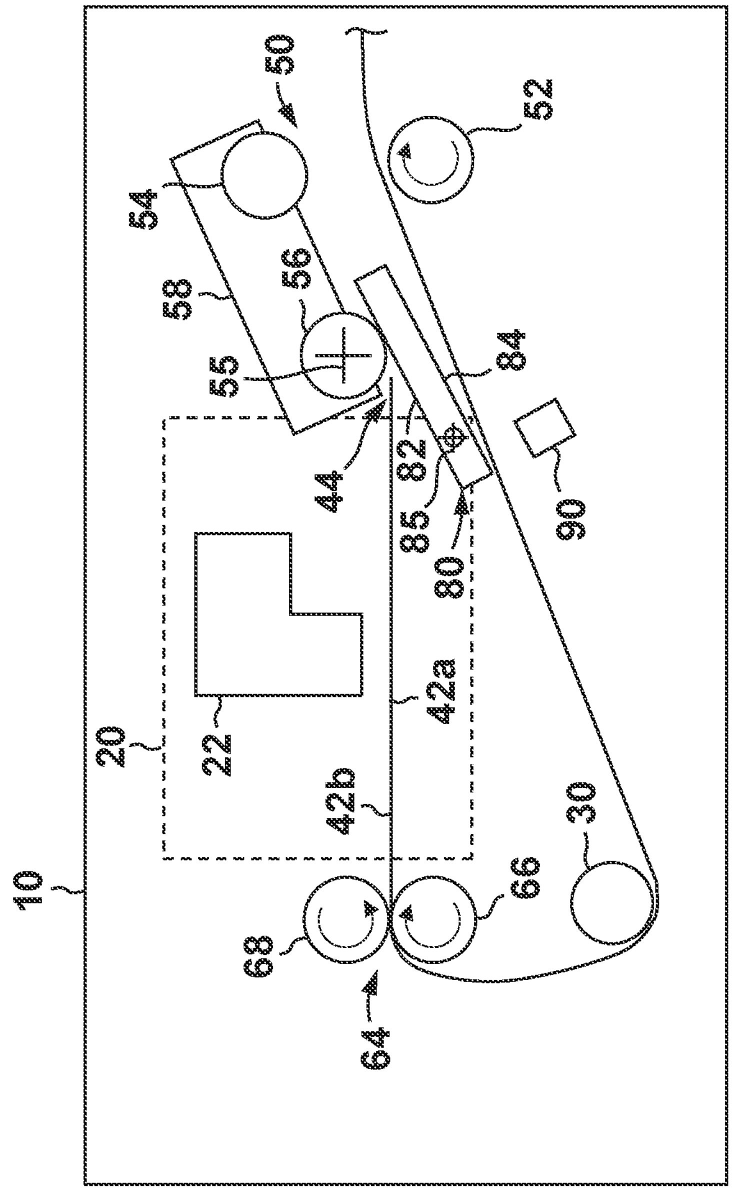

Referring now to FIGS. 5C and 5D, continued rotation of the output roller pinch 50 to advance print media 42 along second path 62 may advance the second edge 44 of print media 42 back to the pick roller 30. Once the print media 42 is engaged by pick roller 30, the pick roller 30 may assist in driving advancement of the print media 42 back toward feed roller pinch 64 (e.g., via first path 60) as previously described, except with the second edge 44 comprising a leading edge of the print media 42.

As previously described, the output roller 52 and feed roller 66 of the output roller inch 50 and feed roller pinch 64, respectively, may be rotated in the same direction by a common motor (e.g., motor 72 shown in FIG. 4). In addition, due to the relatively short distances between the roller pinches 50, 64 via the second path 62, a portion of the print media 42 may still be advancing into the printing device 10 past the output roller pinch 50 along second path 62 when second edge 44 reaches the feed roller pinch 64. Accordingly, simultaneous rotation of the roller pinches 64, 50 may impede advancement of the print media 42 through the print zone 20 via the second path 62. Specifically, if the feed roller pinch 64 (e.g., via feed roller 66) were rotated to advance second edge 44 into print zone 20, the matching rotation of output roller pinch 50 (e.g., via output roller 52) would impede continued advancement of print media 42 into printing device 10 along second path 62. Conversely, if output roller pinch 50 (e.g., via output roller 52) were rotated to advance print media 42 back into printing device 10 along second path 62, the matching rotation of feed roller pinch 64 (e.g., via feed roller 66) would impede advancement of second edge 44 into print zone 20.

Accordingly, once print media 42 advances along second path 62 to pick roller 30, the pick roller 30 may then drive advancement of second edge 44 toward feed roller pinch 64 and the rocker assembly 58 may be rotated about axis of rotation 55 so as to disengage idler wheel 54 from output roller 52 within output roller pinch 50. With the output roller pinch 50 disengaged, the rotational direction of feed roller 66 and output roller, 52 may be reversed to advance second edge 44 past feed roller pinch 64 into print zone 20 without impeding the continued advancement of print media 42 past output roller pinch 50 along the second path 62.

Referring again to FIG. 4, in some examples, controller 100 may determine when the leading edge (e.g., second edge 44) of the print media 42 has advanced to pick roller 30 along second path 62 via sensor 90. Specifically, is the sensor 90 may be positioned at a known location along second path 62 as previously described. Once the presence of print media has been detected along second path 62 using the sensor 90, the controller 100 may continue to rotate the output roller 52 of output roller pinch 50 a predetermined number of times to advance the print media to the pick roller 30. Thereafter, the controller 100 may rotate rocker assembly 58 via actuator 70 to disengage output roller pinch 50 as previously described.

In some examples, controller 100 may also determine whether the print media has successfully advanced into the second path 62 via the output roller pinch 50 using the sensor 90. For instance, upon reversing the rotational direction of output roller pinch 50 to direct print media (e.g., print media 42) along second path 62 (e.g., as discussed above and shown in FIGS. 5B and 5C), the controller 100 may rotate output roller 52 of output roller pinch 50 a predetermined number of rotations to advance the print media to or past the sensor 90 along second path 62. Following this rotation of the output roller pinch 50 (e.g., via output roller 52), if controller 100 detects the presence of print media 42 via the sensor 90, then the controller 100 may determine that the print media 42 has successfully advanced into the second path 62 via second side 84 of gate 80. Conversely, if the controller 100 does not detect the presence of print media 42 via sensor 90 after the predetermined number of rotations of output roller 52, then controller 100 may determine that print media 42 has not successfully advanced into second path 62. Accordingly, the controller 100 may then generate an error message or may perform some other remedial action (e.g., reversing the rotational direction of output roller pinch 50).

As previously described, in some examples, the second path 62 may advance print media 42 back to the first path 60 (so as to route the print media 42 back through the print zone 20) without advancing the print media 42 back to the pick roller 30 via print media tray 40. For instance, in some examples, second path 62 may advance the print media 42 to a separate roller (or roller pinch) that may direct the print media 42 back to first path 60 and print zone 20 as previously described. The separate roller (or roller pinch) may be positioned along the first path 60, downstream (e.g., with respect to the progression of print media 42 along first path 60) of the pick roller 30.

Figure 5E:
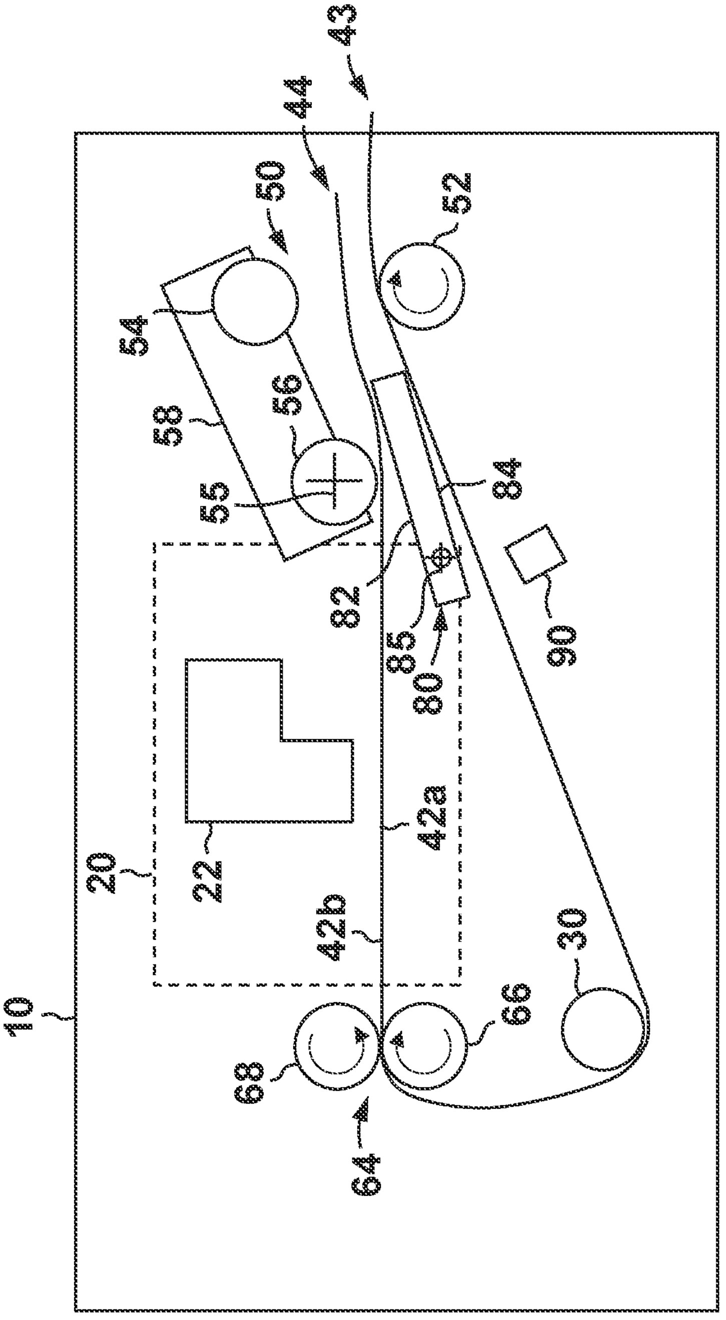

Referring now to FIG. 5E, after second edge 44 has engaged with feed roller pinch 64, and output roller pinch 50 has been disengaged via rocker assembly 58, the feed roller pinch 64 may advance the second edge 44 through print zone 20 so that printing agent may be deposited onto second side 42*b* via printing member 22 (while the first side 42*a* may face away from the printing member 22). Thereafter, the second edge 44 may be advanced out of print zone 20 to engage with first side 82 of gate 80 and idler wheel 56 as previously described. In particular, because the rocker assembly 58 is rotated about the axis of rotation 55 of the idler wheel 56, the position of the idler wheel 56 remains the same when the output roller pinch 50 is engaged or disengaged. As a result, the second edge 44 may contact the idler wheel 56 and first side 82 of gate 80 simultaneously (or substantially simultaneously) so as to deflect gate 80 and avoid deformation of print media 42 within print zone 20 as previously described.

Thus, the gate 80 may be displaced about axis of rotation 85, and second edge 44 may continue past the disengaged output roller pinch 50 (and therefore out of printing device 10). Again, depending on the length of the print media 42 (e.g., between the edges 43, 44), the second edge 44 may advance past the output roller pinch 50 before the first edge 43 is advanced back through the output roller pinch 50 into printing device 10 along second path 62, so that different portions of the print media 42 may simultaneously advance past the output roller pinch 50 in opposing directions. Once the first edge 43 of print media 42 advances past the output roller pinch 50, the rocker assembly 58 may again be pivoted about axis of rotation 55 to compress print media 42 between output roller 52 and idler wheel 54 of output roller pinch 50. As a result, output roller pinch 50 may complete advancement of print media 42 out of the printing device 10 (e.g., and into an output tray or other suitable location).

Referring again to FIG. 4, in some examples, the controller 100 may determine that the trailing edge (e.g., first edge 43) of the print media 42 has advanced past the output roller pinch 50 along second path 62 based on an output from the sensor 90. Specifically, once the sensor 90 no longer detects the presence of print media 42 along second path 62, the controller 100 may determine that the first edge 43 of print media 42 has advanced back into printing device 10, past the output roller pinch 50 so that the rocker assembly 58 may once again be rotated about axis of rotation 55 to pinch the print media 42 between the output roller 52 and idler wheel 54.

Figure 6A:
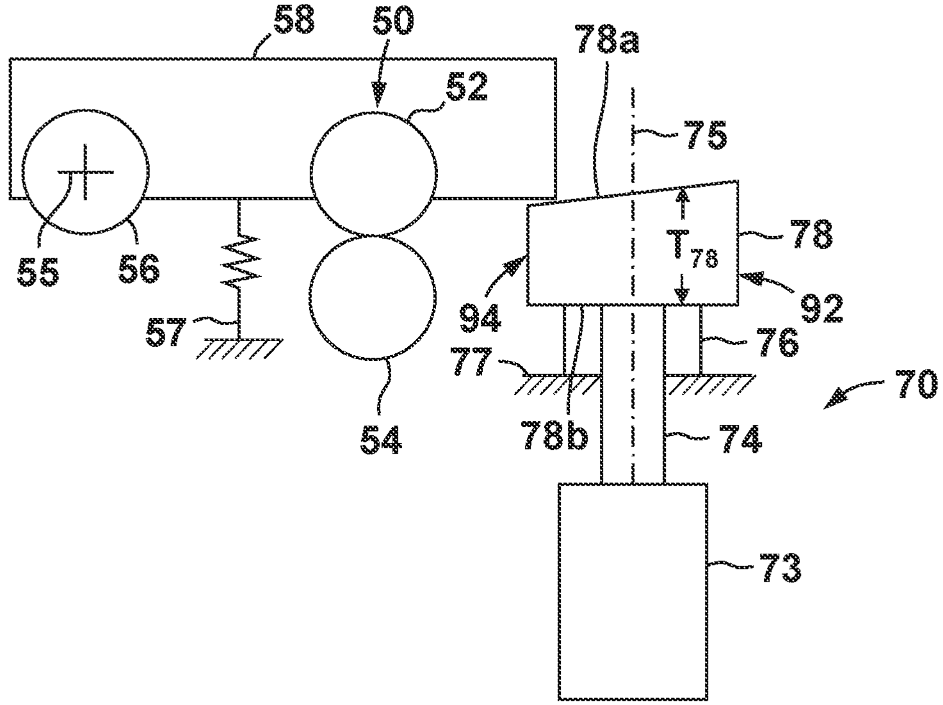
FIGS. 6A and 6B are side views of an actuator for disengaging an output roller pinch of a printing device according to some examples.
Figure 6B:
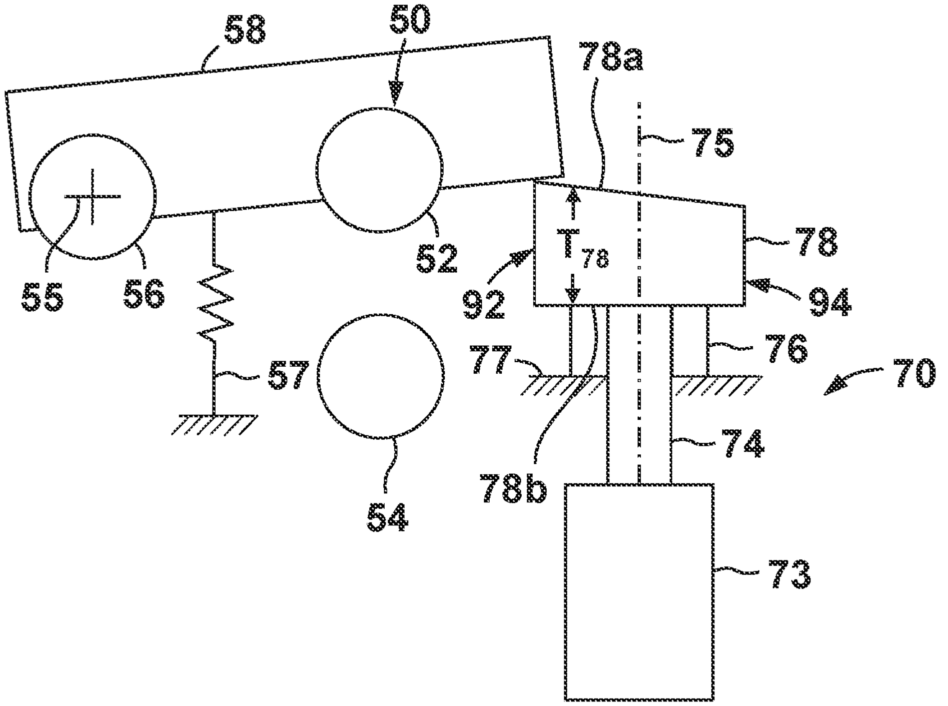

Referring now to FIGS. 6A and 6B, an example of actuator 70 for pivoting the rocker assembly 58 about axis of rotation 55, and thereby selectively disengaging the output roller pinch 50 (FIG. 4) is shown. In some examples, actuator 70 comprises a cam 78 that is slidingly engaged with rocker assembly 58 and pivoted about an axis of rotation 75 by a motor 73.

The cam 78 comprises an annular member having a first side 78*a* and a second side 78*b* opposite first side 78*a*. In the example of FIGS. 6A and 6B, the cam 78 is oriented such that the first side 78*a* is an upper side and the second side 78*b* is a lower side. Thus, in describing the example of FIGS. 6A and 68, the first side 78*a* may be referred to as an "upper side 78*a*" and the second side 78*b* may be referred to as a "lower side 78*b*." However, cam 78 may be placed in a variety of orientations in various examples, and thus no limitation is intended for the relative orientation of the first side 78*a* and second side 78*b*.

The cam 78 may be coupled to an output shaft 74 of a motor 73 so that, during operation, the cam 78 may be rotated by motor 73 about an axis of rotation 75. The motor 73 may comprise an electric motor (e.g., a stepper motor, servo motor). The lower side 78*b* may comprise a planar surface that extends perpendicularly (or substantially perpendicularly) to the axis of rotation 75. The upper side 78*a* may also comprise a planar surface, but the planar surface of the upper side 78*a* may extend at a non-zero angle to the axis of rotation 75. As a result, the cam 78 may comprise a thickness $T_{78}$ that ranges from a relative minimum at a first end 94 of cam 78 to a relative maximum at a second end 92 of the cam 78. The ends 92, 94 may be radially opposite one another across axis of rotation 75 so that the ends 92, 94 are positioned about 180° from one another across axis of rotation 75. In some examples, the upper side 78*a* may comprise a non-planar surface. For instance, in some examples, the upper side 78*a* may comprise a helical or helicoidal curvature that may similarly provide relative maximum and minimum thicknesses $T_{73}$ at the ends 92, 94 as previously described.

A bearing 76 may be engaged with lower side 78$b$ of cam 78 that is secured to structure 77 (e.g., a wall, bracket, column, or other supportive component) within the printing device 10 (FIG. 4). The bearing 76 may comprise a generally cylindrical member that engages with cam 78 and prevents axial movement of cam 78 and motor 73 along axis of rotation 75. In addition, upper side 78$a$ may be engaged with rocker assembly 58 such that, during operations, as cam 78 is rotated about axis of rotation 75 via motor 73, the upper side 78$a$ may slide against the rocker assembly 58.

Rocker assembly 58 may be rotationally biased by a biasing member 57 about axis of rotation 55 so as to engage idler wheel 54 with the output roller 52 of output roller pinch 50. In some examples, the biasing member 57 may comprise a coiled spring, torsion spring, etc. Accordingly, the biasing member 57 may bias the rocker assembly 58 to engage the output roller pinch 50.

During operations, the cam 78 may be rotated about axis of rotation 75 via motor 73 so as to slide upper side 78$a$ along rocker assembly 58 as previously described. More specifically, the cam 78 may be rotated to a first position shown in FIG. 6A in which the upper side 78$a$ is engaged with rocker assembly 58 at or along the second end 94. As previously described, the thickness $T_{78}$ may be at a relative minimum at the second end 94. As a result, when the cam 78 is rotated to the first position of FIG. 6A, the rocker assembly 58 may be allowed to rotate about axis of rotation 55 via the biasing member 57 so as to engage the idler wheel 54 with the output roller 52.

When it is desired to disengage the output roller pinch 50 as previously described, the cam 78 may be rotated by motor 73 to a second position shown in FIG. 6B in which the upper side 78$a$ is engaged with rocker assembly 58 at or along the first side 92. As previously described, the thickness $T_{78}$ may be at a relative maximum at the first end 92. As a result, when the cam 78 is rotated to the second position of FIG. 68, the rocker assembly 58 may be rotated about axis of rotation 55 to disengage the output roller 52 from idler wheel 54 of output roller pinch 50. The cam 78 may be rotated about 180° about axis of rotation 75 via motor 73 to transition the cam 78 between the first position (FIG. 6A) and the second position (FIG. 6B).

Figure 7:
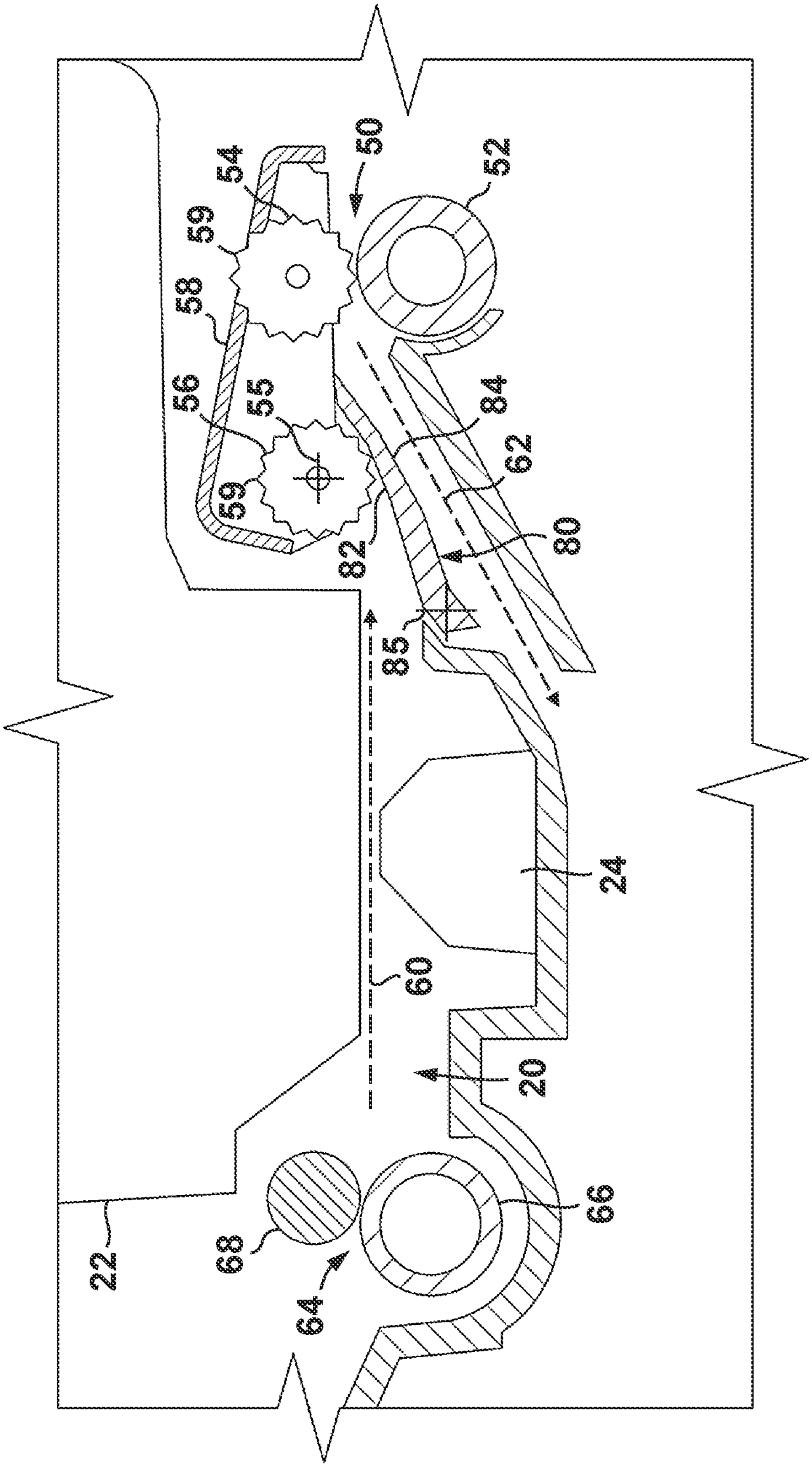
FIG. 7 is an enlarged, side cross-sectional view of internal components of a printing device having a disengage-able output roller pinch according to some examples disclosed herein.

Referring now to FIG. 7, in some examples, print zone 20 may comprise a platen 24 that is positioned between feed roller pinch 64 and the output roller pinch 50 along the first path 60. In addition, the idler wheel(s) 56, 54 coupled to rocker assembly 58 may comprise star wheels that each include a plurality of teeth 59. Further, in some examples, the first side 82 of gate 80 may comprise a concave, curved surface, and the second side 84 may comprise a convex, curved surface. Without being limited to this or any other theory, the concave, curved surface of first side 82 may guide print media (e.g., print media 42) toward output roller pinch 50 when gate 80 is rotationally deflected about axis of rotation 85 as previously described. In addition, the convex, curved surface of the second side 84 may guide or deflect print media (e.g., print media 42) back int the second path 62 as it advances back into printing device 10 (FIG. 4) via output roller pinch 50 as previously described.

While the specific examples discussed above have concentrated on progressing print media along the first path 60 and second path 62 for purposes of performing duplex printing, in some examples, the first path 60 and/or the second path 62 may be utilized for purposes of scanning media (e.g., print media 42). For instance, referring again to FIG. 4, during operations, a piece of media (e.g., print media 42 which may be more generally referred to as "media 42" for purposes of describing an example scanning operation utilizing printing device 10) may be initially fed into the printing device 10 via a scan feed path 96. The scan feed path 96 may direct the media 42 onto the first path 60 either directly or via the second path 62. Thus, in some examples, the scan feed path 96 may provide media 42 to the pick roller 30 (e.g., directly or via the second path 60) to direct the media 42 back onto the first path 60 as previously described. In some examples, the media 42 may be initially fed into the printing device 10 via output roller pinch 50 along second path 62 for purposes of scanning images on the media 42.

A scanning device 67 (e.g., camera) may be positioned along first path 60 (e.g., between pick roller 30 and feed roller pinch 64) that may scan images present on media 42 as the media 42 is advanced toward feed roller pinch 64 and print zone 20 as previously described. Thereafter the media 42 may be advanced out of printing device 10 via output roller pinch 50 in the manner previously described above. For duplex scanning applications, that is where the printing device 10 is to flip the media 42 for purposes of scanning both sides of the media 42 via scanning device 67, the media 42 may then be advanced back into the printing device 10 via the output roller pinch 50 and second path 62 in the manner described above (FIGS. 5B-5E). As a result, a second, opposite side of the media 42 may be exposed to the scanning device 67 when the media 42 is advanced along the first path 60 for the second time.

Given the length of the media 42 and the relative distances between the feed roller pinch 64, output roller pinch 50, pick roller 30, etc., a trailing portion of the media 42 may be advancing into the printing device 10 via output roller pinch 50 along second path 62 as a leading edge (e.g., second edge 44 in FIG. 5E) is advancing out of printing device 10 via output roller pinch 50 during a duplex scanning operation. Accordingly, during a duplex scanning operation, the rocker assembly 58 may be actuated (e.g., via actuator 70 and controller 100) as previously described to selectively disengage the output roller pinch 50 and allow simultaneous movement of media 42 in opposing directions across output roller pinch 50.

The examples disclosed herein include printing devices that are to perform duplex printing (or scanning) while also maintaining a relatively small size thereof. In some examples, a printing device may include an output roller pinch (e.g., output roller pinch 50) that is selectively disengage-able thereby allowing print media to progress in opposing directions along multiple, overlapping and/or intersecting print media paths simultaneously. Accordingly, through use of the examples disclosed herein, an overall size of the printing device may be reduced without sacrificing duplex printing functionality.

In the figures, certain features and components disclosed herein may be shown exaggerated in scale or in somewhat schematic form, and some details of certain elements may not be shown in the interest of clarity and conciseness. In some of the figures, in order to improve clarity and conciseness, a component or an aspect of a component may be omitted.

In the discussion above and in the claims, the terms "including" and "comprising" are used in an open-ended fashion, and thus should be interpreted to mean "including, but not limited to . . . ." Also, the term "couple" or "couples" is intended to be broad enough to encompass both indirect and direct connections. Thus, if a first device couples to a second device, that connection may be through a direct connection or through an indirect connection via other devices, components, and connections. In addition, as used herein, the terms “axial” and “axially” generally mean along or parallel to a given axis (e.g., central axis of a body or a port), while the terms “radial” and “radially” generally mean perpendicular to the given axis. For instance, an axial distance refers to a distance measured along or parallel to the axis, and a radial distance means a distance measured perpendicular to the axis.

As used herein, including in the claims, the word “or” is used in an inclusive manner. For example, “A or B” means any of the following: “A” alone, “B” alone, or both “A” and “B,” In addition, when used herein including in the claims, the word “generally” or “substantially” means within a range of plus or minus 10% of the stated value.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A printing device, comprising:

a print zone in which printing agent is deposited onto a print media;

a first path extending through the print zone to an output roller pinch; and a second path extending into the printing device from the output roller pinch; and a rocker assembly including a first wheel and a second wheel, wherein the second wheel is to engage with an output roller to define the output roller pinch, and wherein the rocker assembly is pivotable about an axis of rotation of the first wheel to move the second wheel away from the output roller to disengage the output roller pinch, and wherein the output roller pinch is to disengage to allow simultaneous advancement of print media along the first path and the second path.

2. The printing device of claim 1, comprising:

a print media tray; and a pick roller to advance print media from the print media tray into the first path, wherein the second path extends from the output roller pinch to the pick roller to direct print media from the second path into the first path.

3. The printing device of claim 1, comprising:

a pivotable gate that is biased into engagement with the first wheel.

4. The printing device of claim 3, wherein a first side of the gate is biased into engagement with the first wheel, and wherein the first path extends along the first side of the gate, and the second path extends along a second side of the gate that is opposite the first side.

5. The printing device of claim 1, comprising an actuator coupled to the rocker assembly, wherein the actuator comprises a cam that is to slidingly engage with the rocker assembly to pivot the rocker assembly about the axis of rotation of the first wheel.

6. A printing device, comprising:

a printing member to deposit printing agent onto a print media;

an output roller pinch adjacent the printing member;

a gate positioned between the printing member and the output roller pinch;

a rocker assembly comprising a first idler wheel and a second idler wheel, wherein the gate is rotationally biased toward the first idler wheel, and wherein the second idler wheel is to engage with an output roller to form the output roller pinch;

a first path extending from the printing member, along a first side of the gate, to the output roller pinch; and a second path extending from the output roller pinch, along a second side of the gate, wherein the second side of the gate is opposite the first side, wherein the output roller pinch is to disengage to allow a leading edge of a print media to advance along the first path as a trailing edge of the print media advances along the second path, wherein the rocker assembly is to pivot about an axis of rotation of the first idler wheel to separate the second idler wheel from the output roller to disengage the output roller pinch.

7. The printing device of claim 6, comprising:

a feed roller pinch adjacent the printing member such that the printing member is positioned between the feed roller pinch and the output roller pinch, wherein the feed roller pinch comprises a feed roller, and a motor coupled to the feed roller and the output roller, wherein the motor is to rotate the feed roller and the output roller in the same direction.

8. The printing device of claim 6, comprising:

a print media tray; and a pick roller to advance print media from the print media tray to the first path, wherein the second path extends from the output roller pinch to the pick roller to advance print media from the second path to the first path.

9. The printing device of claim 8, wherein a first side of print media faces the printing member when the print media is advanced from the print media tray along the first path, and wherein a second side of the print media faces the printing member when the print media is advanced from the second path, to the pick roller, and back to the first path.

10. A printing device, comprising:

a printing member to deposit printing agent onto a print media;

an output roller;

a rocker assembly comprising a first wheel and a second wheel spaced from the first wheel; and a gate that is biased into engagement with the first wheel;

wherein the rocker assembly is to pivot about an axis of rotation of the first wheel to selectively engage the second wheel with the output roller to form an output roller pinch.

11. The printing device of claim 10, wherein the rocker assembly is biased about the axis of rotation of the first wheel to engage the second wheel with the output roller.

12. The printing device of claim 11, comprising a cam that is to slidingly engage the rocker assembly to disengage the second wheel from the output roller.

13. The printing device of claim 10, comprising:

a feed roller, wherein the printing member is positioned between the feed roller and the output roller; and a motor coupled to the feed roller and the output roller, wherein the motor is to rotate the feed roller and the output roller in the same direction.

14. The printing device of claim 13, comprising:

a print media tray;

a first path extending from the print media tray past the printing member via the feed roller and the output roller; and a second path extending from the output roller to the first path, wherein when print media is advanced past the printing member from the print media tray along the first path, the print media is to receive printing agent on a first side of the print media; and wherein when print media is advanced past the printing member via the second path, the print media is to receive printing agent on a second side of the print media.

* * * * *